United States Patent

[11] 3,561,341

| [72] | Inventor | Otto Freudenschusz<br>Vienna, Austria |
| --- | --- | --- |
| [21] | Appl. No. | 700,863 |
| [22] | Filed | Jan. 26, 1968 |
| [45] | Patented | Feb. 9, 1971 |
| [73] | Assignees | Karl Vockenhuber and<br>Raimund Hauser<br>Vienna, Austria, |
| [32] | Priority | Jan. 30, 1967 |
| [33] | | Austria |
| [31] | | A878/67 |

[54] PHOTOGRAPHIC OR CINEMATOGRAPHIC CAMERA
6 Claims, 4 Drawing Figs.

[52] U.S. Cl. .................................................. 95/31,
352/78, 352/170
[51] Int. Cl. ...................................................... G03b 19/04,
G03b 1/60
[50] Field of Search ............................................. 95/31;
352/72, 78, 170, 172, 171; 116/672, (Inquired)

[56] References Cited
UNITED STATES PATENTS
2,585,451  2/1952  Frankel ......................... 352/171

| 2,591,417 | 4/1952 | Frye | 95/31 |
| 3,110,215 | 11/1963 | Jenkins | 352/170(X) |
| 3,297,397 | 1/1967 | Grant | 352/170(X) |
| 3,444,795 | 5/1969 | Nerwin | 95/31 |
| 3,444,798 | 5/1969 | Mayr | 352/72(X) |

FOREIGN PATENTS
| 1,057,444 | 5/1959 | Germany | 95/31 |
| 1,093,661 | 11/1960 | Germany | 95/31 |

Primary Examiner—John M. Horan
Assistant Examiner—David S. Stallard
Attorney—Ernest G. Montague ABSTRACT: A camera adapted to be loaded by insertion of a film carrier including a film length indicator for indicating the length of unexposed film on the film carrier, the film carrier formed with a preselected conformation representing the nominal film capacity of the film, and a sensing device cooperating with the conformation on an inserted film carrier. A mask cooperates with the film length indicator and is controlled by the sensing device and is switched over by the latter in accordance with the nominal capacity of the film carrier for indicating the length of unexposed film on the inserted film carrier.

PATENTED FEB 9 1971

3,561,341

Inventor:
Otto Freudenschuss
By Ernest Montague
Attorney

PHOTOGRAPHIC OR CINEMATOGRAPHIC CAMERA

The invention relates to a photographic or cinematographic camera with film spools or cartridges of different capacity, and with a counter that indicates the film supply.

Means for measuring and indicating the length of the unexposed film in the camera have become known, for instance by the Austrian Pat. Nos. 230,199 (Bauer) and 199,057 (VEB Zeiss Ikon). In these means the diameter of the film coil is scanned by means of a scanner, which is connected with an indicator.

However the above-mentioned arrangements are not suitable for use of films of different thickness. Especially, difficulties arise with cameras with cartridge loading, when one and the same cartridge type is loaded with films of different thickness. While actually the most common films comprise a carrier of triacetate and a thickness of approx. 150 $\mu$, already film materials have become known with a carrier of elongated polyester. These films have a thickness of 50 to 90 $\mu$. When the film cartridges, for instance super 8 cartridges are loaded with so-called thin-layer films, there results the possibility to increase the capacity of the cartridges by one and a half to a threefold value. This again leads to difficulties with the customary cameras in that the counter is harmonized with the standard film material.

It is an object of the present invention to provide a system to enable the use of cartridges and film spools of different capacities in these cameras. It is another object of the present invention to provide scanning means in the camera cooperating with control surfaces on the cartridge or spool, the size and/or position of which depends on the capacity of the cartridge or spool, and thus adjusting the counter corresponding to the capacity of the cartridge or spool.

It is yet still another object of the present invention to provide a camera system in which the counter has at least two scales, which are adjustable by means of the counter drive and which correspond with the different film length capacities of the spool or cartridge, whereby these scales cooperate with masks or the like, which are controlled by means of a scanning means cooperating with the control surfaces of the cartridge or spool.

With these and other objects in view, which will become apparent in the following detailed description, the present invention will be clearly understood in connection with the accompanying drawing, in which.

Figure 1:
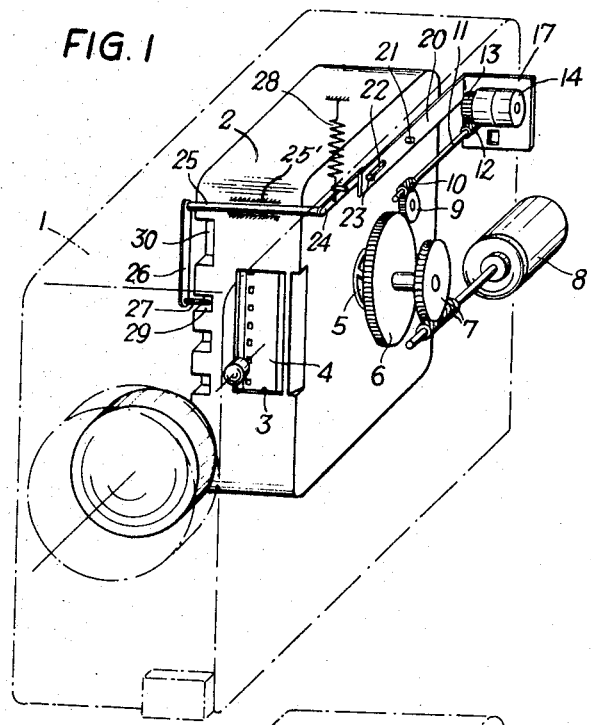
FIG. 1 is a perspective view of a substandard format film camera with a film cartridge, the counter and the drive and control means being schematically illustrated.
Figure 3:
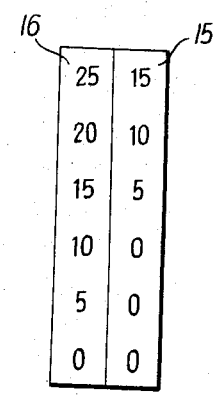
FIG. 3 is a schematic illustration showing the development of the counter cylinder with two scales corresponding with two different capacities.

Referring now to the drawing, and more particularly to FIG. 1, a super 8 cinematographic camera is schematically illustrated, in which for the sake of clarity, any parts which are not essential for the invention have been omitted. In a cartridge chamber the camera contains an inserted film cartridge 2, which is provided with a gate 3 in which a film 4 contained therein is visible. The film 4 is exposed in the range of the film gate 3 by means of a device, not illustrated, and is advanced step by step. The exposed film is rolled up on a film coil (not shown) arranged in the inside of the cartridge and is driven by a catch 5. The catch 5 mates with the gear wheel 6 by means of a claw and a slip clutch, the gear wheel 6 being driven by the camera motor 8 by means of a worm gear 7. The gear wheel 7 drives by means of an intermediate gear 9 a helical gear 10 arranged on the shaft 11. This shaft bears a worm 12 on its other end, which mates with a worm wheel 13 arranged on the axis of the counter cylinder 14. The counter cylinder 14 shows two scales 15 and 16 (note FIG. 3), which are situated opposite a gate in the camera casing. Between this gate and the counter cylinder there is arranged a mask 17 provided with two openings 18 and 19 displaced relatively to each other. The mask 17 is fastened on a two-armed lever 20, which is pivotally arranged on a bolt 21. The free end of the lever 20 has an oblong hole 22 in which engages a pin 23. The pin 23 is fastened on an arm 24 connected to a one-arm lever 26 by means of a shaft 25 rotatably mounted on a bearing 25′. The lever 26 is provided with an extension 27 on its free end. This extension 27 is displaced towards the cartridge 2 under the action of a spring 28 acting on the arm 24. When a notch 29 in the cartridge wall is located opposite the extension 27, the extension 27 snaps into said notch 29 under the action of the spring 28 (see FIG. 1). Thus, the arm 24 is displaced upwardly. This movement is transmitted on the two-armed lever 20 by means of the pin 23 and the oblong hole 22, which lever 20 displaces the mask 17 downwardly. In case, however, a cartridge is inserted, which is not provided with such a notch 29, the extension is displaced forward (in FIG. 1 to the left). The pin 23 arranged on the arm 24 consequently moves downwardly, so that the mask 17 assumes its upper final position. While in the first case the opening 18 releases the scale 16, the scale 15 now becomes visible through the opening 19.

Of course the camera may also be provided for cartridges of three or more different capacities. In this case the notch 29 is modified accordingly in its size and position, so as to enable the transmission of the required number of information. For instance, the width of the notch 29 may be referred to as a measure for the capacity of the cartridge, similar as it is the case in the super 8 cartridge 2, for coding the film speed by means of the notch 30. Here scanning does not occur by means of a pin 27, as demonstrated in the drawing, but by a wedge-shaped key. The depth of immersion of this key determines the indication on the counter by means of the transmitting mechanism.

Figure 2:
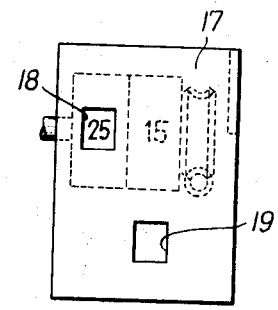
FIG. 2 is a rear elevational view of a detail of the arrangement illustrated in FIG. 1.
Figure 4:
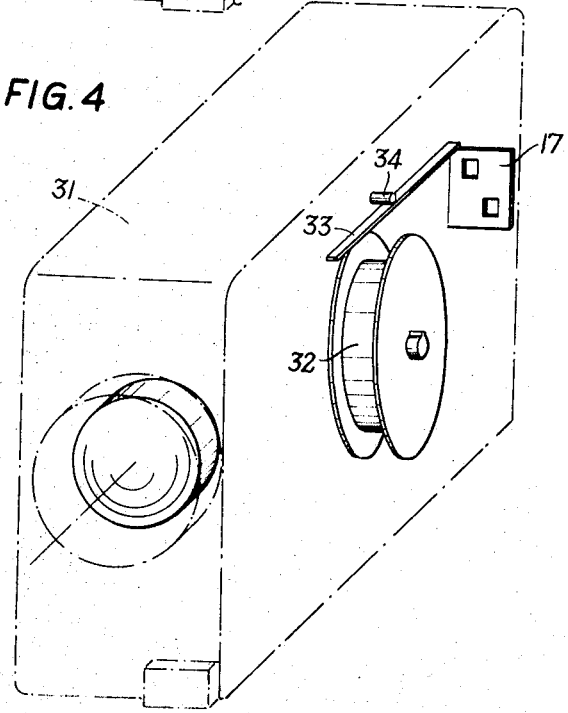
FIG. 4 is a perspective view of a second embodiment of the present invention.

Referring now again to the drawing, and more particularly to FIG. 4, another embodiment of the invention is disclosed. The schematically indicated camera 31 is equipped for loading with film spools and is fit for receiving spools with a capacity of 30 m. at the maximum. In order to obtain a faultless indication on the counter also when loading spools 32 with a capacity of 7.5 m. of film of equal thickness, the diameter of the spool flange is scanned by means of a scanner 33. The scanner 33 is supported by the shaft 34 and bears the mask 17 on a second arm, so that the counter is displaced in analogous way as illustrated in the embodiment according to FIGS. 1 to 3.

Should such an equipment be supposed to be suitable also for use of film materials of different thickness, a control surface preferably arranged on the spool flange should be provided instead of the diameter of the spool flange itself.

The present invention is not restricted to the illustrated embodiments. For instance, also a change-speed gear between the counter and the camera drive may be switched over by the scanning means. The invention may also be advantageously applied to roll film cameras.

I claim:

1. In a camera adapted to be loaded by selective insertion of different film carrying means having different lengths of film therein, film driving means, film length indicating means indicating the length of unexposed film on a film carrying means, the improvement comprising the combination of:
   structural means on said film carrying means having a preselected conformation representing the nominal film length capacity of the film carrying means;
   sensing means in said camera for cooperation with and actuation by said structural means of an inserted film carrying means; and
   means cooperating with said film length indicating means and controlled by said sensing means for being switched over in accordance with the nominal capacity of said inserted film carrying means to indicate the length of unexposed film in said inserted film carrying means.

2. In a camera, as set forth in claim 1, wherein:

said film length indicating means comprises a plurality of scales corresponding, respectively, to the nominal capacities of the different film carrying means; and said means cooperating with said film length indicating means cooperates with said plurality of scales and is adjustable by said sensing means for indicating that scale which corresponds with the nominal capacity of said inserted film carrying means.

3. In a camera adapted to be loaded by selective insertion of different film cartridges having different lengths of film thereon, respectively, film driving means, film length indicating means indicating the length of unexposed film in a film cartridge, the improvement comprising the combination of:

each of said film cartridge formed with surfaces having a preselected conformation representing nominal film length capacity of each of said cartridge, respectively;

sensing means in said camera for cooperation with and actuation by said surfaces of an inserted film cartridge; and means cooperating with said film length indicating means and controlled by said sensing means for being switched over in accordance with the nominal capacity of said inserted film cartridge to indicate the length of unexposed film on said inserted film cartridge.

4. In a camera, as set forth in claim 3, wherein:

said film length indicating means comprises a cylinder carrying a plurality of scales on its cylindrical surface;

said means cooperating with said film length indicating means comprising a mask disposed in front of said cylinder with at least one opening; and said mask being adjustable by said sensing means when the latter is actuated by the surface of said inserted film cartridge, such that an opening in said mask exposes that scale which corresponds with the nominal capacity of said inserted film cartridge.

5. In a camera, as set forth in claim 4, wherein:

said sensing means comprises;

a double-armed lever connected at one arm to said mask and formed with an oblong opening in its other arm;

a member having a projection, the latter entering said oblong opening;

a one-armed lever having an extension at its free end;

a shaft pivotally mounted and connected substantially perpendicularly to said one-armed lever and to said member; and spring means for operatively biasing said extension against said surfaces of said inserted cartridge.

6. In a camera, as set forth in claim 5, wherein said surfaces form a notch in said cartridge and said extension is adapted to enter said notch.